H. J. BUTLER.
TARGET TRAP OPERATING MECHANISM.
APPLICATION FILED JAN. 6, 1910.
990,333.
Patented Apr. 25, 1911.
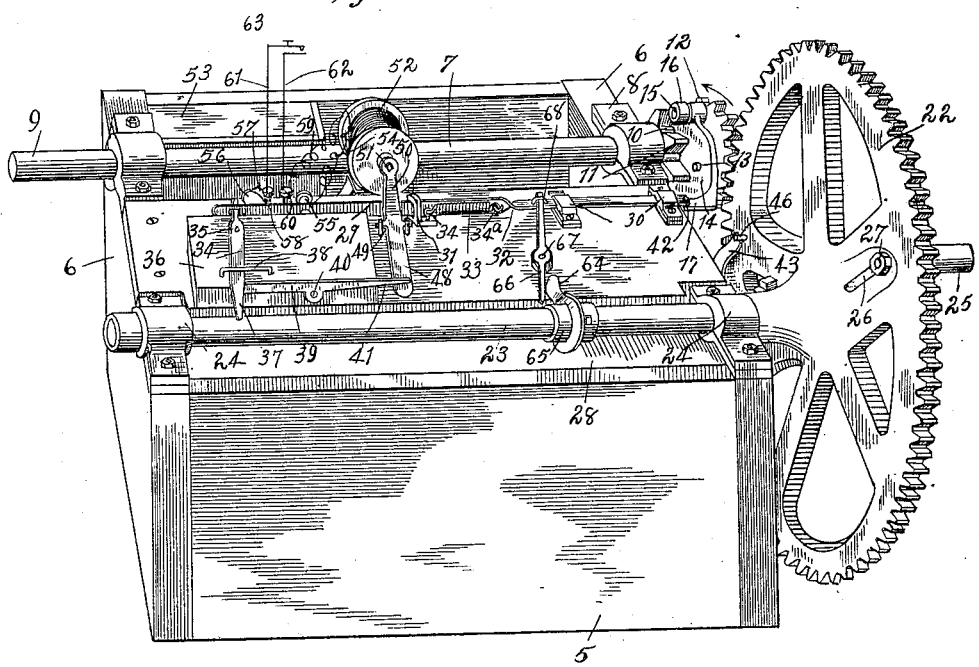
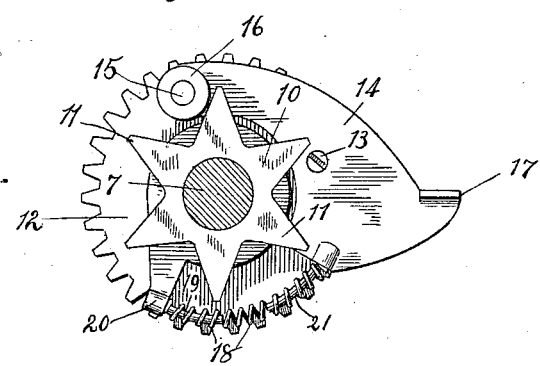
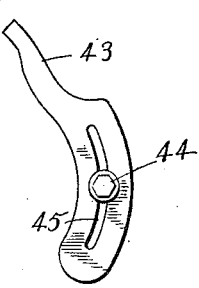
Witnesses:
Chas. F. Bassett
M. A. Milord
Inventor
Henry J. Butler
By Frederick Benjamin
Atty.

UNITED STATES PATENT OFFICE.

HENRY J. BUTLER, OF MAPLE PARK, ILLINOIS.

TARGET-TRAP-OPERATING MECHANISM.

990,333.　　　　　　　Specification of Letters Patent.　　Patented Apr. 25, 1911.

Application filed January 6, 1910. Serial No. 536,767.

*To all whom it may concern:*

Be it known that I, HENRY J. BUTLER, citizen of the United States, residing at Maple Park, in the county of Kane and State of Illinois, have invented certain new and useful Improvements in Target-Trap-Operating Mechanism, of which the following is a specification.

My invention relates to devices for operating target traps, and the chief objects of the improvements which constitute the subject matter of this application for patent are:—to provide an efficient device for the purpose stated; to furnish a trap operating mechanism by the aid of which one person can spring the trap and at the same time attend to other duties such as keeping accurate score, and to provide a tripping mechanism that will enable the shooter to easily operate the traps without interfering with the accuracy of his aim, since the trap is tripped by the pressure of a button, which may be arranged so that it can be operated by the foot.

Other objects of the invention are to provide a tripping device for the purpose specified, in which electricity is employed to release the trip, thus facilitating rapidity of action and permitting a number of traps to be sprung in succession at any rate desired, and to arrange an automatic mechanism that can be used to operate a trap of any type.

I accomplish the results above stated, and others of importance, by means of the appliance illustrated in the accompanying drawing, which forms a part of this application, the details of construction being disclosed in the following views:—

Figure 1 is a perspective view of the complete apparatus; Fig. 2 is a fragmentary view, enlarged, showing the pinion, ratchet and trip pawl, and Fig. 3 is a side view of the spring dog.

Referring to the details of the drawing, the numeral 5 indicates the sides and 6 the ends of a rectangular frame or casing. Arranged longitudinally near the rear of the frame is a main or drive shaft 7, journaled in boxes 8, supported upon the upper margins of the end pieces 6. This shaft extends beyond the frame at each end, and upon one projecting end, indicated at 9 in Fig. 1, is mounted a driving pulley (not shown) adapted to be connected with any convenient source of power which may be a gasolene engine or any other available prime mover. Upon the opposite end of said shaft, outside the frame, is keyed a ratchet wheel 10, having comparatively coarse teeth 11, and upon the extremity of the shaft is loosely mounted a pinion 12. Pivoted to the inner face of the said pinion at 13, is a trip dog or pawl in the form of a plate 14, having its upper end provided with a pin 15, bearing an anti-friction roller 16, adapted to engage the teeth 11 of the ratchet when the said pawl is in its operative position. The lower end of the trip pawl terminates in a flat projection or lug 17, which serves as a catch to hold the pawl in its inoperative position in a manner hereinafter described. The pawl 14 is urged into engagement with the ratchet by means of a coiled spring 18, which is mounted on a suitably curved guide pin 19, fixed in a projection 20 on the hub of the pinion 12, the opposite end of the spring engaging a pin 21 attached to the plate 14. The pinion 12 meshes with a crank gear 22, mounted on the end of a counter shaft 23, arranged parallel with the main or drive shaft 7, and journaled on the end frame pieces in boxes 24. The gear 22 has a crank pin 25, adjustable in a slot 26 in said gear and secured by a nut 27. The purpose of this crank pin is to serve as an attachment for a suitable connection (not shown) with a trap.

Arranged between the parallel shafts 7 and 23, and supported upon the end pieces 6, is a top plate 28, upon which is mounted a trip member 29, slidable in bearings 30, 31. The said member is formed of a flat bar twisted upon its axis at some point 32, so that the planes of the portions lying upon opposite sides of the twist are at right angles to each other. The said bar is urged to its retracted position by a tension spring 33, one end being fixed at the point 34, and the other attached to an eye or staple 34ª in the bar. This bar is normally held in an extended position against the tension of said spring 33 by a lever 34, pivoted at 35 to a block 36, supported upon said top plate 28. One arm of the lever projects loosely through a hole in the trip bar 29, and the other arm 37 considerably longer extends across the top of the block 36 beneath a guide loop 38, and has its extremity projecting over the edge of the block. This lever is retained in its normal position so as to hold the spring 33 under tension by means of a trigger 39, pivoted to the front face of the block 36 at 40, and having one end 41 adapted to engage the front edge of said lever 34, when said end is in its highest position. The horizontal portion of the trip bar 29 projects beyond the frame at the gear end of the machine, and its extremity 42 lies in the path of the trip lug 17, when said bar is extended, as shown in Fig. 1, and when in this position the roller 16 is held out of engagement with the ratchet teeth 11.

Since the pinion 12 is loosely mounted the action of the compression spring 18 would turn said pinion sufficiently to permit the trip pawl, which is pivoted on the pinion, to fall into mesh with the ratchet, unless the action of the bar 29 were supplemented by some other device. The desired result is obtained by means of a spring dog 43, secured to the frame end by a bolt 44, passing through a slot 45, and having its end arranged in the path of a pin 46, projecting from the side of the crank gear 22. This dog will yield and permit the pin to pass when the gear is turned in the forward direction but will prevent the said gear from turning backward and thus coöperate with the trip bar 29, as aforesaid, in holding the pawl 14 out of engagement with the ratchet.

It will be evident that when the various parts already described are in the relative positions shown in Fig. 1 an elevation of the end 41 of the trigger 39 will free the detent lever 34 and release the dog 14 through the action of the spring 33, and to accomplish this automatically I provide a flat bar 48, pivoted at 49, and having its forward end projecting beneath the end 41 of the trigger. The rear end 50 of said bar is bent upward and is provided with a suitable contact point 51, thus forming an armature for an electromagnet 52. This magnet is connected with a battery preferably comprising two dry cells (not shown) stored in a battery box 53. One pole of the magnet is connected by a wire 54 with a binding screw 55 mounted upon the trip bar 29 and having a contact strip 56, connected therewith, and adapted when the bar 29 is extended, to make contact with a terminal 57, supplied with a binding post 58, supported on the top plate 28. The other pole of the magnet is connected by a wire 59 with a binding post 60. In order to enable the operator to complete the circuit through the magnet, the posts 58 and 60 are furnished, respectively, with wires 61, 62 which may be led to any convenient point, where they are supplied with any form of circuit closing device such as a push button represented diagrammatically at 63.

When the bar 29 is retracted by the spring 33 it is automatically restored to its original position by means of a cam 64, fixed on a collar 65, mounted on the shaft 23. This cam is operatively connected with the trip bar 29, by a lever 66, pivoted at 67, and having its rear arm passing through a loop or eye 68 on the said bar, its opposite end projecting into the path of the said cam 64.

The operation of the device is as follows:—The crank pin 25 having been connected with the trap in any convenient manner, power is applied to the shaft 7 from any available source, as previously stated, and if the parts are in the positions shown in Fig. 1 with the pawl 14 held by the trip 29 out of engagement with the ratchet 10, the rotation of the shaft 7 and its ratchet will have no effect upon the rest of the mechanism, since the pinion 12 is loosely mounted. When the operator desires to spring the trap he closes the circuit through the magnet 52 by pressing the button 63, which may be arranged so that it can be conveniently operated by the foot. The closing of the circuit will act through the armature 50 to lift the end 41 of the trigger 39, and thus free the lever 34. The action of the spring 33 will retract the bar 29 releasing the pawl 14 which will immediately fall into engagement with the ratchet 10. The pinion 12 will now move with the shaft in the direction shown by the arrow until the gear 22 makes a single revolution, and as it rotates the cam 64 will engage the end of the lever 66 and force the trip bar 29 outward to its extended or operative position, with the projecting end 42 of said bar lying in the path of the lug 17, thus throwing the pawl 14 out of mesh and stopping the gear movement. It is to be noted that when the bar 29 is retracted, the contact between the parts 56, 57, will be instantly broken and the armature extension 48 will fall to its initial position, so that when the bar 29 is reset by the action of the cam 64 the trigger 39 will automatically engage the lever 34 and retain the trip mechanism in its normal position.

Having thus described my invention, what I claim as new, is:—

In an apparatus of the class described, a support, a main-shaft and a countershaft journaled parallel therewith on said support, a gear fixed on said countershaft and adapted to be adjustably connected with a trap, a pinion loosely mounted on the main shaft and intermeshing with said gear, and means for effecting an intermittent operative engagement between said pinion and main shaft, said means comprising a star-wheel on said main shaft, a spring-held trip-lever pivoted on said main shaft, adapted to engage said star-wheel, and having an extension, a bar adapted to engage said extension and hold said lever in inoperative position, an electro-magnet and means for energizing same, an armature pivoted on said support and operated by said electro-magnet, releasing levers pivoted on said support and operated by said armature, a holding lever pivoted on said support and connected with said bar, and a cam on said countershaft adapted to engage and operate said holding lever.

In testimony whereof I affix my signature in the presence of two witnesses.

HENRY J. BUTLER.

Witnesses:
F. BENJAMIN,
T. M. POYNTON.

Copies of this patent may be obtained for five cents each, by addressing the "Commissioner of Patents, Washington, D. C."